United States Patent
Beauchamp et al.

(10) Patent No.: US 8,032,261 B1
(45) Date of Patent: Oct. 4, 2011

(54) COOLING SYSTEM WITH ADAPTIVE PROTOCOL COOLING UNIT

(75) Inventors: Robert M. Beauchamp, Milford, MA (US); Phillip J. Roux, Sutton, MA (US)

(73) Assignee: EMC Corporation, Hopkinton, MA (US)

( * ) Notice: Subject to any disclaimer, the term of this patent is extended or adjusted under 35 U.S.C. 154(b) by 359 days.

(21) Appl. No.: 12/338,766

(22) Filed: Dec. 18, 2008

(51) Int. Cl.
*G05D 23/00* (2006.01)
*G06F 1/00* (2006.01)

(52) U.S. Cl. ........ 700/299; 700/300; 713/300; 713/310; 318/599; 318/811

(58) Field of Classification Search .................. 713/300, 713/310, 320; 700/299–300; 318/400.7, 318/599, 811
See application file for complete search history.

(56) References Cited

U.S. PATENT DOCUMENTS

| | | | | |
|---|---|---|---|---|
| 6,188,189 B1 * | 2/2001 | Blake | ............................ | 318/471 |
| 6,268,664 B1 * | 7/2001 | Rolls et al. | ...................... | 307/32 |
| 6,470,289 B1 * | 10/2002 | Peters et al. | ................... | 702/132 |
| 6,725,132 B2 * | 4/2004 | Frankel et al. | ................. | 700/300 |
| 6,778,386 B2 * | 8/2004 | Garnett et al. | ............ | 361/679.48 |
| 7,141,950 B1 * | 11/2006 | Verge | ......................... | 318/400.29 |
| 7,262,959 B2 * | 8/2007 | Makino | ..................... | 361/679.33 |
| 7,272,945 B2 * | 9/2007 | Bash et al. | ....................... | 62/180 |

* cited by examiner

Primary Examiner — Ramesh Patel

(57) ABSTRACT

A cooling system includes a fan unit having a terminal receiving a signal representative of a commanded fan speed and a terminal for receiving a signal representative of actual fan speed. A system controller is responsive to temperature and the actual fan speed, for producing control signals for fan to adjust fan speed in accordance with the temperature and the actual fan speed, for producing the control signals in one of a plurality of different predetermined two-wire communication protocols. The system includes a fan controller and a two-line communication bus coupling the control signals between the system controller and the fan controller. The fan controller detects the one of the plurality of predetermined two-wire communication protocols on the two-wire communication bus and provides, in accordance with such detection, one terminal of the fan unit with the commanded fan speed and transmits the signal representative of the actual fan speed to the system controller via the communication bus.

8 Claims, 4 Drawing Sheets

COOLING SYSTEM WITH ADAPTIVE PROTOCOL COOLING UNIT

TECHNICAL FIELD

This invention relates generally to cooling systems and more particularly to cooling systems used in cabinets for storing electrical components.

BACKGROUND

As is known in the art, one technique used to cool electrical components in electrical cabinets is with fans. The amount of airflow (and thus the cooling) through the cabinet is controlled by adjusting the speed of the fans in accordance with the temperature within the cabinet. The individual fan speed (RPM) is typically adjusted by varying the duty-cycle of a Pulse-Width-Modulated (PWM) control signal that is the control input signal to the fan (i.e., a desired fan speed). The actual fan speed (RPM) is monitored with a signal produced by a fan-mounted tachometer.

As is also known in the art, in some cabinets there is a plurality of temperature sensors disposed at various locations within the cabinet. The PWM signal is generated by a system controller or system microcontroller that responds to the sensed temperatures. The system microcontroller may transmit the desired PWM signal (i.e., desired RPM) directly to the fans and the actual RPM signal produced by the tachometers may be fed directly to the system microcontroller. Thus, the fan unit has a pair of terminals, in addition to power terminal and ground terminal), one terminal for the desired fan speed in PWM from the system microcontroller the other terminal for actual fan speed from the tachometer.

As is also known in the art, there are a variety of different communication protocols used to communicate between devices and a microcontroller. One is Inter-Integrated Circuit (I2C), sometimes also referred to as, and hereinafter referred to as, two-wire interface (TWI)) where a pair of lines is provided; one line for data and one line for clock—these two in combination providing the information between the microcontroller and the device (in this case the fans) and another is UART which also has a pair of lines; one for transmitting data (Tx) to the device and the other for receiving data (Rx) from the device.

SUMMARY

In accordance with the present invention, a cooling system for a storage cabinet is provided. The cooling system includes a fan unit having a pair of terminals, a first one of the pair of terminal receiving a signal having a first protocol representative of a commanded fan speed and a second one of the pair of terminals transmitting a second signal having a second protocol representative of actual fan speed. A sensor is disposed to sense temperature with the cabinet. A system controller is responsive to the sensed temperature and the actual fan speed, for producing control signals for fan to adjust fan speed in accordance with the sensed temperature and the actual fan speed, the system controller producing the control signals in one of a plurality of different predetermined two-wire communication protocols. The system includes a fan controller and a two-line communication bus coupling the control signals between the system controller and the fan controller. The fan controller has a first pair of terminals connected to the two-line communication bus and a second pair of terminals connected to pair of terminals of the fan unit. The fan controller detects the one of the plurality of predetermined two-wire communication protocols on the two-wire communication bus and provides, in accordance with such detection, the first terminal of the pair of fan unit terminals with the signal having the first protocol representative of the commanded fan speed and transmits the signal at the second terminal of the pair of fan unit terminals with the second protocol representative of the actual fan speed to the system controller via the communication bus.

In one embodiment, the first protocol is pulse width modulation and the second protocol is a train of pulses.

In one embodiment, one of the protocols is TWI.

In one embodiment, one of the protocols is UART.

In one embodiment, one of the protocols includes as one signals thereof a PWM signal and the other signal the actual fan speed signals.

In one embodiment, fan controller includes: a mode detection controller coupled to the two-wire communication bus for detecting the one of the plurality of predetermined two-wire communication protocols on the two-wire communication bus; a routing section coupled to the mode detection controller for coupling the pair of fan unit terminals to the two-line communication bus selectively in accordance with the one of the plurality of protocols detected by the mode detection controller; and a decoder/encoder, coupled to the mode detection controller, the two-line communication bus, and the pair fan unit terminals, for encoding and decoding protocols of signals passing between the pair of fan unit terminals and the two-line communication bus selectively in accordance with protocols detected by the mode detection controller, one of such signals being the pulse width modulated signal representative of a commanded fan speed and another one of such signals being the signal representative of actual fan speed.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
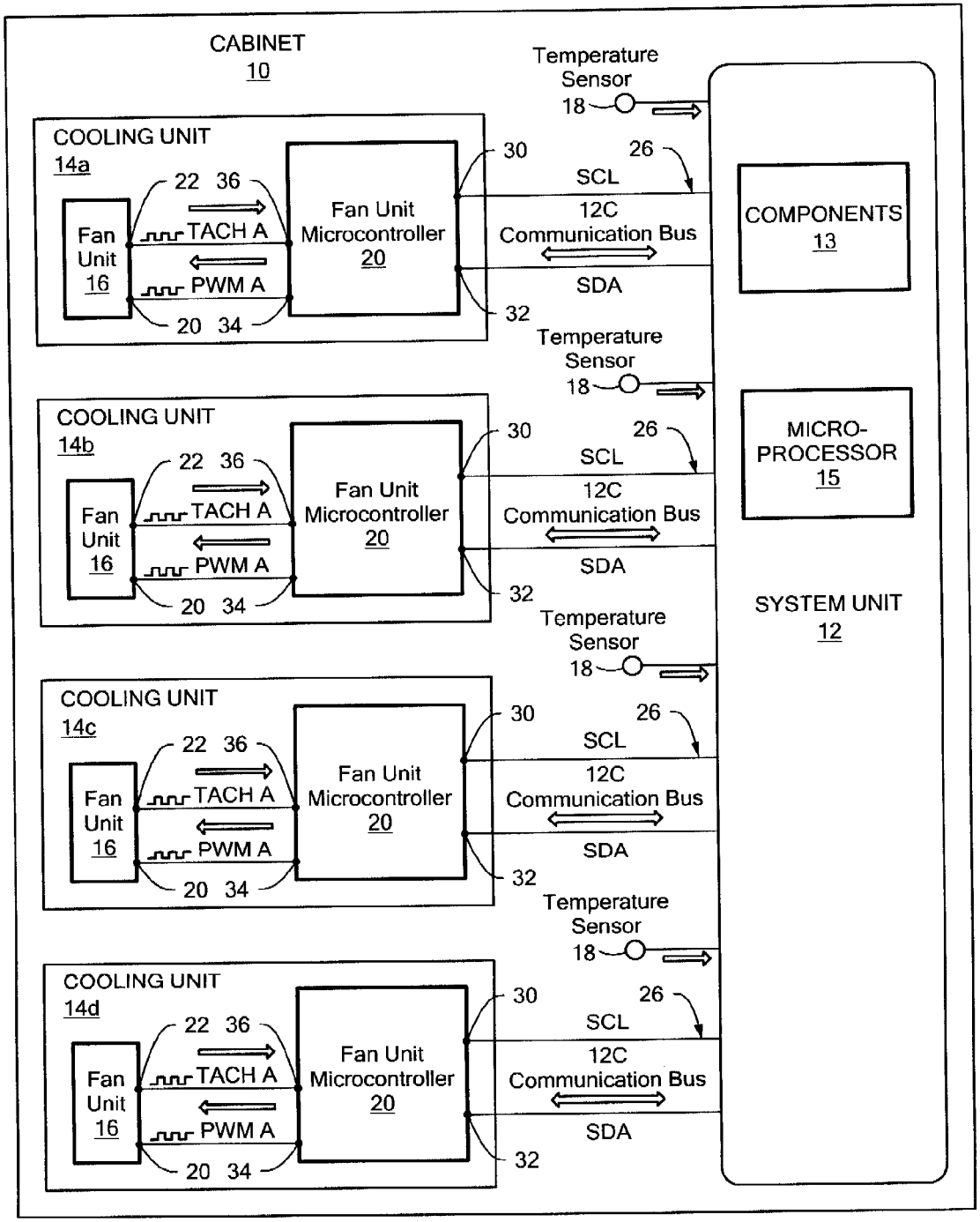
FIG. 1 is a diagram of a cabinet having a cooling system according to the invention, here such cooling system operating with TWI communication protocol.

Referring now to FIG. 1, a cabinet 10 is shown for storing a system comprising a system unit 12 having electrical components 13 including a system microcontroller 15 therein and a plurality of, here four, cooling units 14a-14d electrically coupled to the system unit 12 for cooling the electrical components 13 and system microcontroller 15. Each one of the four cooling units 14a-14d is identical in construction and includes a fan unit 16 for drawing external cooling air into the cabinet 10 towards the system unit 12. The cabinet 10 includes a plurality of sensors 18 disposed at various locations within the cabinet 10 to sense the temperature of the cooling air drawn into the cabinet 10.

More particularly, a cooling system is provided for the storage cabinet 10. The cooling system includes the fan units 14a-14d. Each one of the fan units 14a-14d has a pair of terminals 20, 22; a first one of the pair of terminals, here terminal 20 for receiving a signal having a first protocol, for example, pulse width modulation (PWM), representative of a commanded fan speed and a second one of the pair of terminals, here terminal 22 transmitting a signal having a second protocol, here for example a train of pulses having a frequency representative of actual fan speed.

The system microcontroller 15 is responsive to the sensed temperatures and the actual fan speed signals (as produced by fan tachometers, not shown, on terminal 22), for producing control signals for fan units 14a-14d to adjust fan speeds in accordance with the sensed temperatures and the actual fan speed signals, the system microcontroller producing the control signals in one of a plurality of different predetermined two-wire communication protocols. Here, for example, in FIG. 1, the protocol is I2C. In the system shown in FIG. 2 the protocol is UART. In the system in FIG. 3 the protocol is PWM for commanded fan speed and a train of pulses indicating actual fan speed.

Figure 3:
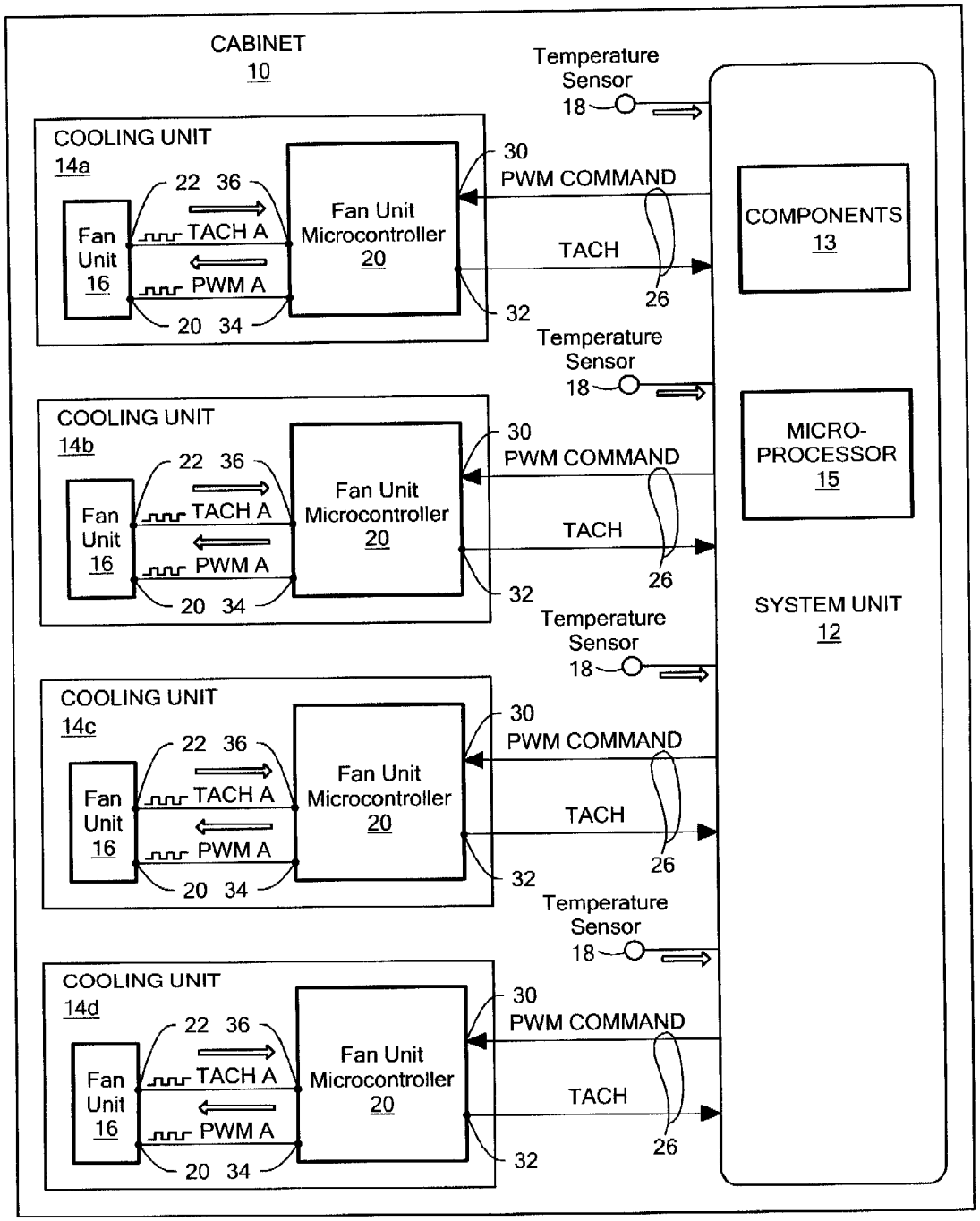
FIG. 3 is a diagram of a cabinet having a cooling system according to the invention, here such cooling system operating with PWM/pulse train communication protocol.
Figure 4:
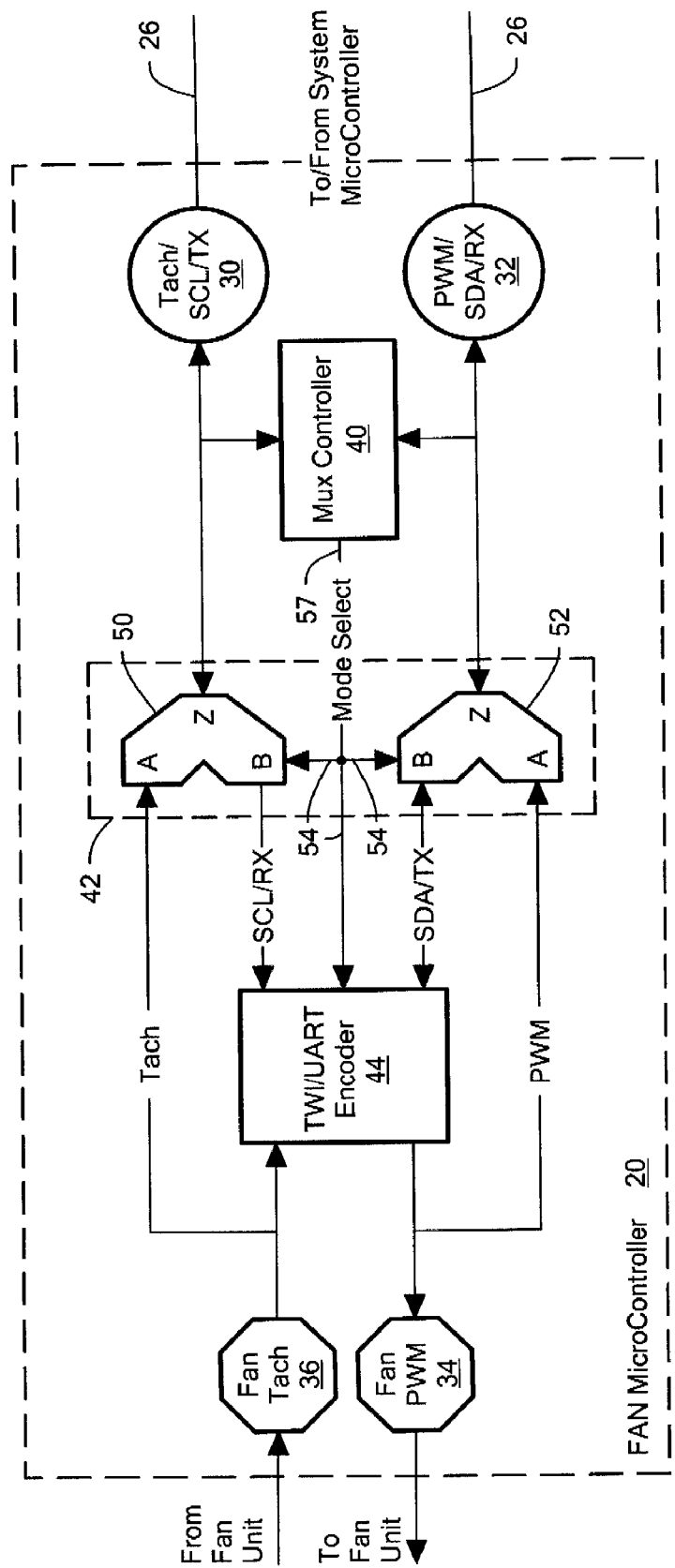
FIG. 4 is a block diagram of a fan unit microcontroller used in the cooling system of FIGS. 1, 2 and 3.

Each one of the fan units 14a-14d includes a fan controller 24, shown in more detail in FIG. 4). Each one of the fan units 14a-14d is connected to the system unit 12 though a two-wire communication bus 26. In FIG. 1 the two-wire bus 26 passes I2C signals (i.e., clock (SCL) and data (SDA)) carrying desired fan unit 16 RPM to the fan unit microcontroller 20 from the system microcontroller 15 and carrying the actual fan unit 16 RPM to the from the fan unit microcontroller 15 to the system microcontroller 20, in FIG. 2 the two-wire bus 26 passes UART signals (i.e., a transmit signal, TX)) carrying desired fan unit 16 RPM to the fan unit microcontroller 20 from the system microcontroller 15 and a receive signal, Rx and carrying the actual fan unit 16 RPM to the from the fan unit microcontroller 15 to the system microcontroller 20, and in FIG. 3 the two-wire bus 26 passes a pulse width modulated signal representing the desired RPM fan speed signal to the fan unit microcontroller 20 from the system microcontroller 15 a train of pulses having a frequency representing actual fan unit 16 RPM to from the fan unit microcontroller 15 to the system microcontroller 20.

Referring again to FIG. 1, the fan controller 24 has a first pair of terminals 30, 32 connected to the two-line communication bus and a second pair of terminals 34, 36 connected to pair of terminals 20, 22 of the fan units 14a-14d. Thus, terminal 30 is connected to the one of the wires of the two-wire bus 26 carrying the clock signal (SCL) of the TWI protocol and terminal 32 is connected to the one of the wires of the two-wire bus 26 carrying the data signal (SDA) of the TWI protocol data signal. Thus, the TWI protocol signals on terminals 30, 32 carry desired fan unit 16 RPM to the fan unit microcontroller 20 from the system microcontroller 15 carry the actual fan unit 16 RPM to the from the fan unit microcontroller 15 to the system microcontroller 20. Terminal 34 is connected to the PWM terminal 20 of the fan unit 16 and terminal 36 is connected to the tachometer output terminal 22 of the fan unit 16.

The fan controller 24 detects the one of the plurality of predetermined two-wire communication protocols on the two-wire communication bus 26 and provides, in accordance with such detection, the first terminal 20 of the pair of fan unit 16 terminals 20, 22 with the signal having the first protocol, here pulse width modulation, representative of the commanded fan speed and transmits the signal at the second terminal 22 of the pair of fan unit 16 terminals 20, 22 having the second protocol, here a train of pulses having a frequency representative of the actual fan speed to the system microcontroller 15 via the communication bus 26.

Figure 2:
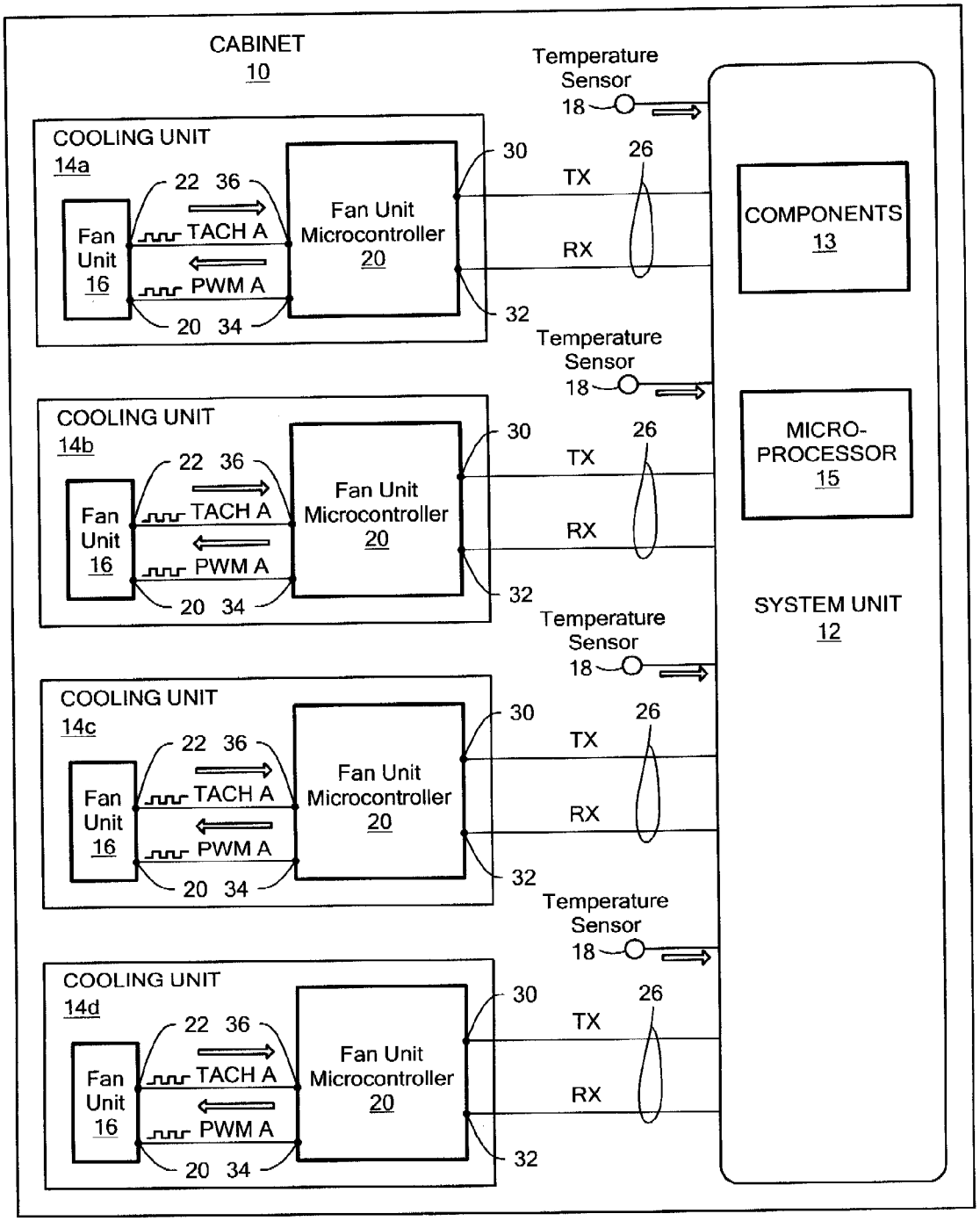
FIG. 2 is a diagram of a cabinet having a cooling system according to the invention, here such cooling system operating with UART communication protocol.

Referring to FIG. 2, terminal 30 is connected to the one of the wires of the two-wire bus 26 carrying the Tx data of the UART protocol and terminal 32 is connected to the one of the wires of the two-wire bus 26 carrying the RX data signal of the UART protocol data signal. Terminal 34 is connected to the PWM terminal 20 of the fan unit 16 and terminal 36 is connected to the tachometer output terminal 22 of the fan unit 16. Thus, terminal 30 carries data in UART protocol representative of desired fan unit 16 RPM to the fan unit microcontroller 20 from the system microcontroller 15 terminal 32 carries data in UART protocol representative of the actual fan unit 16 RPM to the from the fan unit microcontroller 15 to the system microcontroller 20.

Referring to FIG. 3, terminal 30 is connected to the one of the wires of the two-wire bus 26 carrying the PWM signal representative of desired fan speed to the fan units 14a-14d from the system microcontroller 15 to the fan unit microcontroller 20 and terminal 32 is connected to the one of the wires of the two-wire bus 26 carrying the train of pulse produced by the tachometer, not shown, of the fan units 14a-14d representative of actual fan speed to from the fan unit microcontroller 20 to the system microcontroller 15. Terminal 34 is connected to the PWM terminal 20 of the fan unit 16 and terminal 36 is connected to the tachometer output terminal 22 of the fan unit 16.

More particularly, referring to FIG. 4, the fan controller 24 includes: a mode detection controller 40 coupled to the two-wire communication bus 26 for detecting the one of the plurality of predetermined two-wire communication protocols on the two-wire communication bus 26; a routing section 42 coupled to the mode detection controller 40 for coupling the pair of fan unit terminals 34, 36 to the two-line communication bus 26 selectively in accordance with the one of the plurality of protocols detected by the mode detection controller 40; and a decoder/encoder 44, coupled to the mode detection controller 40, the two-line communication bus 26, and the pair fan unit terminals 20, 22, for encoding and decoding protocols of signals passing between the pair of fan unit terminals 20, 22 and the two-line communication bus 26 selectively in accordance with protocols detected by the mode detection controller 40, one of such signals being the signal representative of a commanded fan speed and another one of such signals being the signal representative of actual fan speed on terminal 22.

The mode detection controller 40 detects the protocol in accordance with the following truth table, where a logic 1 indicated that the mode detection controller 40 has within a relatively short time after activation detected a signal, and a logic 0 indicates that the mode detection controller 40 has within a relatively short time after activation not detected a signal:

| DETECTED PROTOCOL | TERMINAL 30 | TERMINAL 32 |
|---|---|---|
| TWI | 1 | 1 |
| PWM | 1 | 0 |
| UART | 0 | 1 |

Thus, if signals are detected at both terminal 30 and terminal 32, the protocol is I2C; if signals are detected at terminal 30 but not at terminal 32 the protocol is PWM, and is signals are detected at terminal 32 but not at terminal 30, the protocol is UART.

It is also noted that: with an I2C protocol, the SCL clock signal will have a continuous clock with synchronized SDA signals if SDA is toggling; with a UART protocol the signal on TX will have periodic data with idle streams and unsynchronized RX/TX. UART expects fixed baud rate (or "auto-baud" packets); with a PWM protocol, the PWM signal will have a variable duty cycle (can be a DC level).

Still more particularly, and referring to FIGS. 1-4, the routing section 42 includes a pair of multiplexer/selectors 50, 52. Each one of the multiplexer/selectors 50, 52 include ports A, B and Z. Port A or port B is coupled to port Z selectively in accordance with control signals fed to the multiplexer/selectors 50, 52 on line 54 by the mode detection controller 40. When the mode detection controller 40 detects (as determined by the truth table above) that the protocol on bus 26 is either TWI or UART, the mode detection controller 40 produces a logic signal, here for example, logic 1, and, in response thereto port B of the multiplexer/selectors 50, 52 is coupled to port Z of the multiplexer/selectors 50, 52 with the result that TWI signals and UART signals are coupled between the terminals 30, 32 and terminals 34, 36 through the encoder/decoder 44; whereas if the mode detection controller 40 detects that the protocol on bus 26 is PWM, the mode detection controller 40 produces a logic signal, here for example, logic 0, and, in response thereto port A of the multiplexer/selectors 50, 52 is coupled to port Z of the multiplexer/selectors 50, 52 with the result that the PWM signals at terminal 32 by-pass the encoder/decoder 44 and passes directly to the terminal 34 and the pulse train signals at terminal 36 pass directly to terminal 30.

When TWI is detected by the mode detection controller as the protocol being used (as determined by the truth table above), the encoder/decoder 44 (typically a microprocessor) produces a train of pulses with a PWM on terminal 34 corresponding to data from the TWI signals and converts the frequency of the train of pulses produced by the fan unit 16 on terminal 36 into I2C data representative of actual fan speed data TWI data. On the other hand, when UART is detected by the mode detection controller 40 as the protocol being used (as determined by the truth table above), the encoder/decoder 44 produces a train of pulses with a PWM at terminal 20 corresponding to data from the UART TX signals and converts the frequency of the train of pulses produced by the fan unit 16 on terminal 22 into UART RX data representative of actual fan speed on terminal 32.

A number of embodiments of the invention have been described. Nevertheless, it will be understood that various modifications may be made without departing from the spirit and scope of the invention. Accordingly, other embodiments are within the scope of the following claims.

What is claimed is:

1. A cooling system for a storage cabinet, such cooling system comprising:
   a fan unit, such fan unit having a pair of terminals, a first one of the pair of terminal for receiving a signal having a first protocol representative of a commanded fan speed and a second one of the pair of terminals transmitting a signal having a second protocol representative of actual fan speed;
   a sensor disposed to sense temperature with the cabinet;
   a system controller, responsive to the sensed temperature and the actual fan speed, for producing control signals for fan to adjust fan speed in accordance with the sensed temperature and the actual fan speed, the system controller producing the control signals in one of a plurality of different predetermined two-wire communication protocols;
   a fan controller;
   two-line communication bus coupling the control signals between the system controller and the fan controller;
   wherein the fan controller has a first pair of terminals connected to the two-line communication bus and a second pair of terminals connected to pair of terminals of the fan unit; and
   wherein the fan controller detects the one of the plurality of predetermined two-wire communication protocols on the two-wire communication bus and provides, in accordance with such detection, the first terminal of the pair of fan unit terminals with the signal having the first protocol representative of the commanded fan speed and transmits the signal at the second terminal of the pair of fan unit terminals having the second protocol representative of the actual fan speed to the system controller via the communication bus.

2. The system recited in claim 1 wherein the first protocol is pulse width modulation and wherein the second protocol is a train of pulses.

3. The cooling system recited in claim 1 wherein one of the protocols is TWI.

4. The cooling system recited in claim 1 wherein one of the protocols is UART.

5. The cooling system recited in claim 1 wherein one of the protocols includes as one signals thereof a PWM signal and the other signal the actual fan speed signals.

6. The cooling system recited in claim 1 wherein the fan controller includes:
   a mode detection controller coupled to the two-wire communication bus for detecting the one of the plurality of predetermined two-wire communication protocols on the two-wire communication bus;
   a routing section coupled to the mode detection controller for coupling the pair of fan unit terminals to the two-line communication bus selectively in accordance with the one of the plurality of protocols detected by the mode detection controller;
   a decoder/encoder, coupled to the mode detection controller, the two-line communication bus, and the pair fan unit terminals, for encoding and decoding protocols of signals passing between the pair of fan unit terminals and the two-line communication bus selectively in accordance with protocols detected by the mode detection controller, one of such signals being the signal representative of a commanded fan speed and another one of such signals being the signal representative of actual fan speed.

7. A cooling system for a storage cabinet, such cooling system comprising:
   a fan unit, such fan unit having a pair of terminals, a first one of the pair of terminal for receiving a pulse width modulated signal representative of a commanded fan speed and a second one of the pair of terminals representative of actual fan speed;
   a sensor disposed to sense temperature with the cabinet;
   a system controller, responsive to the sensed temperature and the actual fan speed, for producing control signals for fan to adjust fan speed in accordance with the sensed temperature and the actual fan speed, the system controller producing the control signals in one of a plurality of different predetermined two-wire communication protocols, a first one of the protocols is UART, a second one of the protocols is TWI, and third one of the protocols includes as one signals thereof a PWM signal and the other signal the actual fan speed signals;

a fan controller;

two-line communication bus coupling the control signals between the system controller and the fan controller;

wherein the fan controller has a first pair of terminals connected to the two-line communication bus and a second pair of terminals connected to pair of terminals of the fan unit; and wherein the fan controller detects the one of the plurality of predetermined two-wire communication protocols on the two-wire communication bus and provides, in accordance with such detection independent of whether the detected one of the protocols in the first, second, or third protocol, the first terminal of the pair of fan unit terminals with the pulse width modulated signal representative of the commanded fan speed and transmits the signal at the second terminal of the pair of fan unit terminals representative of the actual fan speed to the system controller via the communication bus.

8. The cooling system recited in claim 7 wherein the fan controller includes:

a mode detection controller coupled to the two-wire communication bus for detecting the one of the plurality of predetermined two-wire communication protocols on the two-wire communication bus;

a routing section coupled to the mode detection controller for coupling the pair of fan unit terminals to the two-line communication bus selectively in accordance with the one of the plurality of protocols detected by the mode detection controller;

a decoder/encoder, coupled to the mode detection controller, the two-line communication bus, and the pair fan unit terminals, for encoding and decoding protocols of signals passing between the pair of fan unit terminals and the two-line communication bus selectively in accordance with protocols detected by the mode detection controller, one of such signals being the pulse width modulated signal representative of a commanded fan speed and another one of such signals being the signal representative of actual fan speed.

\* \* \* \* \*